United States Patent [19]

King, Jr.

[11] Patent Number: 4,609,634

[45] Date of Patent: Sep. 2, 1986

[54] HIGH EFFICIENCY EXTRACTION METHOD FOR RECOVERING OXIDATION CATALYST MATERIAL FROM DIMETHYL TEREPHTHALATE ESTERIFIED OXIDATE RESIDUE AND THE LIKE

[75] Inventor: William M. King, Jr., New Hanover County, N.C.

[73] Assignee: American Hoechst Corporation, Somerville, N.J.

[21] Appl. No.: 227,012

[22] Filed: Jan. 21, 1981

Related U.S. Application Data

[63] Continuation-in-part of Ser. No. 135,844, Mar. 31, 1980, abandoned.

[51] Int. Cl.[4] .................. B01J 38/68; C07C 67/48; C07C 67/08
[52] U.S. Cl. .................. 502/24; 423/49; 423/150; 560/77; 560/78
[58] Field of Search .................. 252/412, 413, 420; 560/77, 78; 423/49, 139, 150; 502/24, 28

[56] References Cited

U.S. PATENT DOCUMENTS

| | | | |
|---|---|---|---|
| 2,680,757 | 6/1954 | Himel et al. | 260/439 |
| 2,727,921 | 12/1955 | Taves | 260/524 |
| 2,865,708 | 12/1958 | Dinsmore et al. | 252/412 |
| 2,964,559 | 12/1960 | Burney et al. | 260/525 |
| 3,105,851 | 10/1963 | Knobloch et al. | 260/525 |
| 3,168,485 | 2/1965 | Knobloch et al. | 252/444 |
| 3,341,470 | 9/1967 | Hensley, Jr. | 252/413 |
| 3,465,013 | 9/1969 | Ichikawa | 260/439 |
| 3,519,684 | 7/1970 | Witt | 260/524 |
| 3,525,762 | 8/1970 | Ichikawa | 260/439 |
| 3,673,154 | 6/1972 | Trevillyan | 260/524 R |
| 3,780,096 | 12/1973 | Johnson | 252/412 |
| 3,873,468 | 3/1975 | Kobinata | 252/413 |
| 3,880,920 | 4/1975 | Wampller | 252/413 |
| 3,890,374 | 6/1975 | Fujii et al. | 560/77 |
| 3,896,047 | 7/1975 | Atcock | 252/420 |
| 3,914,287 | 10/1975 | Takeda et al. | 560/77 |
| 3,950,409 | 4/1976 | Yokuta et al. | 260/524 R |
| 4,096,340 | 6/1978 | Fujii et al. | 560/77 |
| 4,157,246 | 6/1979 | Eakman et al. | 252/412 |
| 4,196,076 | 4/1980 | Fujimoto et al. | 210/21 |
| 4,314,974 | 2/1982 | Libby et al. | 423/139 |

FOREIGN PATENT DOCUMENTS

| | | |
|---|---|---|
| 2249605 | 2/1977 | Fed. Rep. of Germany . |
| 52/145389 | 12/1977 | Japan . |
| 52/145390 | 12/1977 | Japan . |
| 53/37592 | 4/1978 | Japan . |
| 413705 | 11/1977 | U.S.S.R. . |

OTHER PUBLICATIONS

*Chemical Engineers' Handbook*—John H. Peery (Editor) McGraw-Hill Book Co., N.Y., 1950, pp. 716-718.

*Primary Examiner*—P. E. Konopka
*Attorney, Agent, or Firm*—George H. Hopkins

[57] ABSTRACT

Disclosed is a highly efficient continuous method for the aqueous extraction of water-soluble oxidation catalyst material from a residue such as that generated in the production of dimethyl terephthalate from p-xylene by the molecular oxygen oxidation and methanol esterification process. In the method the desired end product is an aqueous solution of the catalyst material. The residue to be extracted is established in finely dispersed condition in part of the aqueous solution at a weight ratio of aqueous solution to residue of above about 1:1 and maintained in that condition for a length of time sufficient for maximum transfer of catalyst material from the residue to the aqueous solution to take place. The resulting dispersion then is separated in a phase separation zone into an aqueous phase and an extracted residue phase. The separated aqueous phase is withdrawn from the phase separation zone as the aqueous solution. The separated extracted residue phase is withdrawn from the phase separation zone, and part of it is admixed gently with an aqueous solvent (for example, water) and returned to the phase separation zone.

13 Claims, 1 Drawing Figure

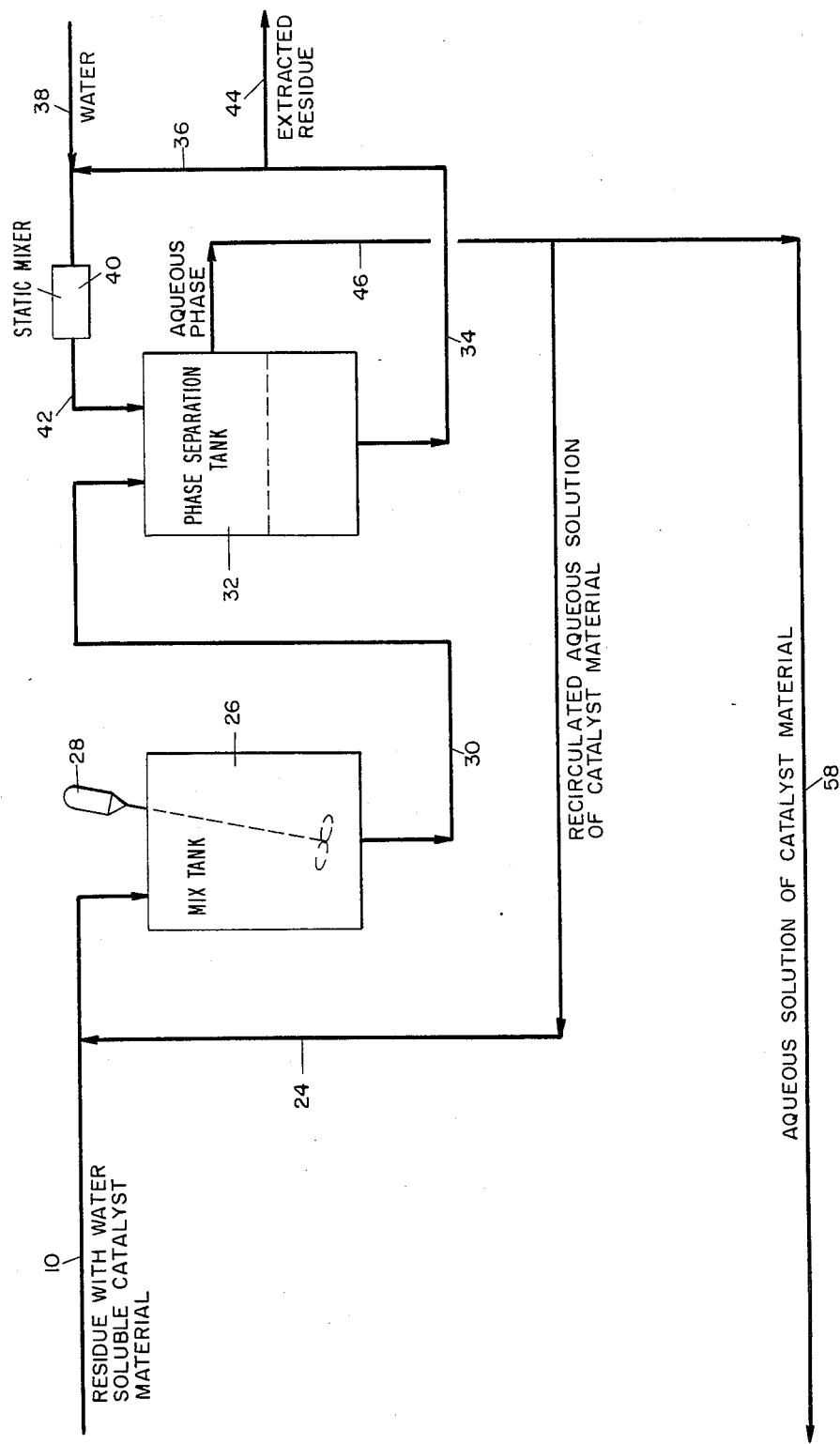

HIGH EFFICIENCY EXTRACTION METHOD FOR RECOVERING OXIDATION CATALYST MATERIAL FROM DIMETHYL TEREPHTHALATE ESTERIFIED OXIDATE RESIDUE AND THE LIKE

The application is a continuation-in-part of the copending application, Ser. No. 06/135,844, filed Mar. 31, 1980, now abandoned.

This invention resides in the chemical arts. More particularly, it relates to that branch of organic chemistry having to do with aromatic carboxylic acids, esters thereof and processes for making them.

Dimethyl terephthalate (herein "DMT") is a well known chemical of commercial importance. It is used in enormous quantities in the production of polyester polymers from which fibers, film and the like are made.

A classic process for making DMT comprises the steps of oxidizing p-xylene in the liquid state with molecular oxygen to form p-toluic acid, esterifying the acid with methanol to form methyl p-toluate, oxidizing methyl p-toluate with molecular oxygen to form monomethyl terephthalate, and esterifying the monomethyl terephthalate with methanol to form DMT. Oxidation of p-xylene and methyl p-toluate with molecular oxygen is generally effected with an oxidation catalyst such as a heavy metal catalyst, which in preferred embodiments also catalyzes the esterification reactions. Examples of oxidation catalysts disclosed in the art include cobalt or a salt thereof, manganese or a salt thereof, nickel or a salt thereof, both cobalt or a salt thereof and manganese or a salt thereof, both nickel or a salt thereof and manganese or a salt thereof, and the like. The salts generally are soluble in the oxidation and esterification reaction mixtures. They also are generally water soluble. This classic process can be carried out on a batch basis or on a continuous basis.

In a preferred practice of the process the oxidation steps are carried out together in an oxidation stage comprising one or more reactors, and the esterification steps are carried out together in an esterification stage comprising one or more reactors. This is referred to herein as the cooxidation-coesterification process. Patents disclosing embodiments of the cooxidation-coesterification process are the U.S. Pat. Nos. 2,772,305, to Levine et al., and the 2,894,978, to Katzchmann. See also "Hydrocarbon Processing", November 1975, page 131. In the commercial practice of the cooxidation-coesterification process, which is done on a continuous basis, p-xylene is introduced into the oxidation stage, reaction mixture formed in the oxidation stage, herein referred to as oxidate, is introduced along with methanol into the esterification stage, and reaction mixture formed in the esterification stage is removed therefrom and distilled to give a methyl p-toluate fraction and a bottoms fraction. The methyl p-toluate fraction is conducted to the oxidation stage. The bottoms fraction is distilled to give a DMT fraction and a residue fraction. The DMT fraction is treated to obtain DMT of the desired degree of purity. The residue fraction, herein called DMT esterified oxidate residue, is purged in whole or in part from the process. In those DMT plants in which only part is purged, the remainder is cycled to the oxidation stage.

DMT esterified oxidate residue comprises a tar-like organic or tarry fraction and an oxidation catalyst fraction. The concentration of the oxidation catalyst fraction generally is in the range from about 300 to about 5000 p.p.m. (parts by weight per million parts by weight of residue). However, lower and higher concentrations are possible and within the scope of this invention. Until a few years ago the purged DMT esterified oxidate residue usually was disposed of by burning. However, because of the ever spiraling price of crude oil from which is derived most of the p-xylene used in the production of DMT, and the increasing cost of catalyst material, especially of cobalt, the art has begun to devote its attention to recovering p-xylene values from the tarry fraction, finding higher value uses for the tarry fraction, and recovering for reuse the catalyst fraction. This invention is concerned with the recovery of the catalyst fraction.

The state of the art with respect to the recovery of the oxidation catalyst fraction from DMT esterified oxidate residue appears to be represented by the following references:

Derwent Abstract of West German examined application No. 2,249,605, published Feb. 3, 1977
Derwent Abstract of U.S.S.R. Pat. No. 413,705, published Nov. 29, 1977
U.S. Pat. No. 4,096,340, to Fujii et al.

The Derwent abstract of the West German application discloses the recovery of cobalt from residue by extraction at 50°–150° C. with an aqueous medium containing organic acids, which aqueous medium may be the condensate of the off-gases of the oxidation step, or a solution containing low molecular weight saturated aliphatic acids such as acetic and formic acids.

The Derwent abstract of the U.S.S.R. patent discloses treatment of residue with an aqueous alkali solution at 90°–95° C., whereby there results a cobalt-containing precipitate. The precipitate is separated by filtration and cobalt is extracted from the precipitate by treatment with sulfuric acid at 95°–100° C.

The U.S. patent of Fujii et al. discloses the recovery of the oxidation catalyst material from the residue by extraction with an aqueous solvent such as water, solutions of lower aliphatic alcohols and water, and solutions of lower fatty acids and water. The patent specifically notes that the extraction can be carried out by any of such liquid-liquid extraction systems as batch extraction, concurrent multistage extraction, countercurrent multistage extraction and continuous countercurrent extraction systems.

It has been found, however, that in the water extraction of catalyst material from residue that high-shear, high-speed mixing of water and residue followed immediately by phase separation results in an extracted residue with still a substantial concentration of catalyst material. Hence, a basic problem to which this invention provides a solution is how to improve the efficiency of the aqueous extraction of water soluble oxidation catalyst material from DMT esterified oxidate residue.

In summary, this invention provides a highly efficient continuous method for the recovery by aqueous extraction of water-soluble oxidation catalyst material from DMT esterified oxidate residue. In the method the desired end product is an aqueous solution of the catalyst material. The residue to be extracted is established in finely dispersed condition in part of said aqueous solution at a weight ratio of aqueous solution to residue above 1:1, and maintained in this dispersed condition for a period of time sufficient for substantial transfer of catalyst material from the residue to the aqueous solution. The resulting dispersion is phase separated in a phase separation zone. Aqueous phase is withdrawn from the zone. It is said aqueous solution. The residue phase is withdrawn as the extracted residue. However, at least half of the withdrawn extracted residue is admixed gently with an aqueous solvent, and the resulting mixture is introduced into the phase separation zone. As a result, extremely high extraction efficiencies are obtained, 99–100% having been demonstrated with the typical extraction efficiency being in the range of 96–99%.

It is important in the first step of the method that the weight ratio of the aqueous solution to the residue to be extracted be established and maintained above 1:1. A satisfactory weight ratio is 2:1. Below the 1:1 weight ratio, the aqueous solution becomes dispersed in the residue, and stable emulsion formation tends to occur under the high shear mixing action needed to finely disperse the residue in the aqueous solution. Above the weight ratio 1:1, the rapid admixing at high shear of the aqueous extractant and the residue results in unstable emulsions that rapidly break.

The period of time in which the finely dispersed residue is maintained in such condition in the aqueous solution is dependent on the extent of catalyst extraction desired. For maximum catalyst extraction the period of time is at least about 20 minutes. As a practical matter about 40 minutes appears to be the most time that need be involved.

The aqueous solvent gently admixed with recycled extracted residue is characterized by a concentration of oxidation catalyst material substantially lower than the concentration of catalyst material in the end product aqueous solution. Examples of the aqueous solvent include water, condensate of the off-gases from the DMT process oxidation and esterification steps, and the like. The condensate comprises lower fatty acids such as acetic and formic acids. In those instances where the aqueous solvent has an acid content its pH should be in a range from about 3 to about 9. The pH of the aqueous solvent should not be above about 9 because of the possibility of precipitation of the catalyst material, which should be avoided.

The rate of introduction of aqueous solvent into the catalyst recovery system of the invention can vary over a wide range, depending on concentration of catalyst material in the incoming residue, the desired extent of removal of catalyst material from the residue, and amount of water that can be tolerated subsequent to the practice of the method of this invention. However, a weight ratio of aqueous solvent to incoming residue in the range from about 0.14:1 to about 1:1 gives satisfactory results with a weight ratio of 0.2:1 to about 0.5:1 being preferred. At weight ratios less than about 0.14:1, extraction efficiencies become inadequate, while at weight ratios above about 1:1, the amount of water becomes impractical in the handling of the aqueous solution of catalyst material obtained by the method of this invention.

The proportion of extracted residue admixed with aqueous solvent and returned to the phase separation zone should be at least half by weight and at most about 4/5 by weight with about ⅔ by weight being preferred. The extracted residue withdrawn from the phase separation zone generally has a residual water content of approximately 2%. Without recirculation of extracted residue in admixture with aqueous solvent, this water content contains dissolved catalyst material, and a loss of extraction efficiency is observed. It has been found that by contacting extracted residue with aqueous solvent and then allowing phase separation to take place, the catalyst-bearing water content is displaced from the extracted residue by the aqueous solvent to thereby remove substantially all of the residual catalyst material from the extracted residue stream purged from the catalyst recovery system of this invention.

As above indicated, part of the aqueous solution of catalyst material withdrawn from the phase separation zone is recycled as the aqueous extractant for the incoming, catalyst containing residue. The remainder of the aqueous solution, having a typical catalyst material concentration in the range from about 300 to about 10,000 p.p.m., is removed from the system and either with or without further treatment (physical or chemical) ultimately returned to the oxidation stage of the DMT process.

Although up to this point the invention has been described in the context of DMT esterified oxidate residue, it in its broader scope is not so limited. In other words, the method of this invention in its broader aspects applies to other catalyst-containing residues, provided the catalytic compounds are water-soluble, and the residues are similar to DMT esterified oxidate residue in such physical properties as water immiscibility and in being inert under the conditions of this invention. Thus, this invention in its broader aspects is applicable to the recovery of oxidation catalyst material from the residues generated in the molecular air oxidation of xylenes as in the production of isophthalic and terephthalic acids. In this regard, a preferred embodiment of this invention in its broader aspects is directed to the recovery of catalyst material from the residue generated in the well-known process for making terephthalic acid by the molecular oxygen oxidation of p-xylene. In that process the oxidation is carried out in acetic acid, and is effected with water-soluble oxidation catalyst material such as above described in conjunction with the DMT process, and an auxiliary material such as a bromide, acetaldehyde, methyl ethyl ketone, and the like. The oxidation results in a reaction mixture which, after removal of terephthalic acid and acetic acid therefrom, yields a water-immiscible organic residue containing water-soluble oxidation catalyst material.

The best mode now contemplated of carrying out the invention is illustrated in the drawing which is a material part of these disclosures.

The drawing illustrates in diagrammatic fashion a typical flow sheet of a preferred embodiment of this invention.

In the drawing DMT esterified oxidate residue containing water soluble catalyst material, typically having a temperature of about 180° C., and with its viscosity, (adjusted, if necessary, by the addition, for example, of methyl-para toluate), less than 50 cps. (measured at 100° C. with a Brookfield viscometer, spindle #2) is introduced by way of a feed conduit 10 into a mix tank 26. Also introduced into the mix tank 26 as by way of a recirculation conduit 24 joined to the feed conduit 10 is a stream of recirculated aqueous solution of catalyst material, its flow rate being such that the weight ratio of aqueous solution to residue is above about 1:1. In the mix tank 26 the residue and aqueous solution are admixed as by means of a mixer 28 to finely disperse the residue into the aqueous solution. The size of the mix tank is selected so that at normal operative flow rates the residence time of the resulting dispersion in the mix tank 26 is at least 20 minutes.

Dispersion is withdrawn from the mix tank 26 and conducted by way of conduit 30 into a phase separation tank 32. In this tank the dispersed residue phase is permitted to coalesce and separate from the aqueous phase, the residue phase forming the bottom layer and the aqueous phase forming the top layer.

Extracted residue phase is withdrawn from the phase separation tank 32 as by withdrawal conduit 34 joined to a recycle conduit 36. At least half by weight of the withdrawn extracted residue phase is conducted through the recycle conduit 36 to a static mixer 40. Water is also introduced into the static mixer 40 as by way of water conduit 38 joined to the connecting conduit 36. The water and extracted residue in the static mixer 40 are subjected to gentle mixing action, that is, mixing action sufficient to admix the water and extracted residue, and replace with the water the residual droplets of aqueous solution of catalyst material in this extracted residue, but insufficient to create a stable emulsion. The resulting mixture is conducted by way of a return conduit 42 to the phase separation tank 32, wherein phase separation of this mixture also takes place.

The remainder of the extracted residue phase withdrawn from the phase separation tank 32 by way of conduit 34 is removed from the system by way of extracted residue discharge conduit 44. Because of the recirculation of the other portion of the extracted residue, and mixing of the same with water, the extracted residue removed from the system through the discharge conduit 44 has a very low concentration, if at all, of catalyst material.

Aqueous phase, an aqueous solution of catalyst material, is withdrawn from the phase separation tank 32 by way of conduit 46. Part of it is recycled through the recirculation conduit 24 and feed conduit 10 into the mix tank 26. The other part, either with or without further treatment (physical or chemical) is ultimately returned to the oxidation stage of the DMT process. An example of such further treatment is a p-xylene wash step in which the small amount of residue that might be entrained with the aqueous phase or solution when it is withdrawn from the phase separation tank 32 is separated therefrom. This step comprises admixing the aqueous solution with p-xylene, and then separating the resulting p-xylene phase from the aqueous phase. This optional step of a p-xylene wash might be of benefit in the event the aqueous solution is held in a storage tank before it is returned to the DMT oxidation stage.

Typical flow rates, catalyst concentration and temperature conditions in the embodiment of the drawing are set forth in the following table.

It will be observed that a typical catalyst concentration of the residue entering the system is 1200 p.p.m., while a typical catalyst concentration of the extracted residue leaving the system is typically 0–30 p.p.m. Hence, this invention provides a highly efficient method for the aqueous extraction of catalyst material from DMT and esterified oxidate residue.

Similar results are contemplated in substituting for the residue of the foregoing example oxidation catalyst material bearing residue resulting from the well-known process for producing terephthalic acid by the molecular air oxidation of p-xylene in acetic acid with oxidation catalyst material and a bromide activator.

Various features, advantages and other specific embodiments of this invention will become readily apparent to those exercising ordinary skill in the art after reading the foregoing disclosures. These specific embodiments are within the scope of the claimed subject unless otherwise expressly indicated to the contrary. Moreover, while a specific embodiment of this invention has been described in considerable detail, variations and modifications of this embodiment can be effected without departing from the spirit and scope of the invention as disclosed.

What is claimed is:

1. A continuous method for the recovery of water-soluble oxidation catalyst material from a water-immiscible organic residue containing the same, in which an aqueous solution of said catalyst material is obtained, which comprises establishing said residue in finely divided dispersion in part of said aqueous solution at a weight ratio of aqueous solution to said residue over 1:1, and maintaining said residue in said dispersion for a period of time sufficient for substantial transfer of said catalyst material from said residue to said aqueous solution, separating in a phase separation zone the dispersion into an aqueous phase and an extracted residue phase, withdrawing extracted residue phase from said separation zone, gently admixing at least half of said extracted residue phase with an aqueous solvent, and introducing the resulting mixture into said phase separation zone, withdrawing as said aqueous solution aqueous phase from said phase separation zone, discharging as extracted residue the remainder of the extracted residue phase, and discharging as an aqueous solution of recovered oxidation catalyst material the remainder of said aqueous solution.

2. A continuous method for the recovery of water-soluble oxidation catalyst material from DMT esterified oxidate residue containing the same, in which an aqueous solution of said catalyst material is obtained, which comprises establishing said residue in finely divided

TABLE

|  | 10 | 24 | 30 | 34 | 36 | 38 | 44 | 46 | 58 |
|---|---|---|---|---|---|---|---|---|---|
| Residue, pph | 10,000 | 146 | 10,146 | 29,621 | 19,650 | — | 9,971 | 175 | 29 |
| Water, pph | — | 20,000 | 20,000 | 606 | 404 | 4,118 | 202 | 23,916 | 3,916 |
| Catalyst Concentration, ppm | 1,200 | 3,000 | 2,400 | 0–30 | 0–30 | 0 | 0–30 | 2,980 | 3,000 |
| Temperature, °C. | 180 | 95 | 95–100 | 95 | 95 | 95 | 95 | 95 | 95 |

Note:
Water-soluble oxidation catalyst material is predominantly a water-soluble cobalt salt.
"pph" means parts by weight per hour.

dispersion in part of said aqueous solution at a weight ratio of aqueous solution to said residue over 1:1, and maintaining said residue in said dispersion for a period of time sufficient for substantial transfer of said catalyst material from said residue to said aqueous solution, separating in a phase separation zone the dispersion into an aqueous phase and an extracted residue phase, withdrawing extracted residue phase from said separation zone, gently admixing at least half of said extracted residue phase with an aqueous solvent, and introducing the resulting mixture into said phase separation zone, withdrawing as said aqueous solution aqueous phase from said phase separation zone, discharging as extracted residue the remainder of the extracted residue phase, and discharging as an aqueous solution of recovered oxidation catalyst material the remainder of said aqueous solution.

3. A method according to claim 2 in which said weight ratio of aqueous solution to said residue is about 2:1.

4. A method according to claim 2 in which up to 4/5 of said extracted residue is admixed with said aqueous solvent.

5. A method according to claim 4 in which said period of time is about 20–40 minutes.

6. A method according to claim 5 in which the viscosity of the DMT esterified oxidate residue is less than about 50 cps. when measured at 100° C. with a Brookfield viscometer using spindle #2.

7. A method according to claim 6 in which ½–4/5 of the extracted residue is gently admixed with said aqueous solvent.

8. A method according to claim 7 in which about ⅔ of the extracted residue is gently admixed with said aqueous solvent.

9. A method according to claim 8 in which said steps are carried out at about 85°–110° C.

10. A method according to claim 9 in which the weight ratio of said aqueous solvent to said DMT esterified oxidate residue is in a range from about 0.14:1 to about 1:1.

11. A method according to claim 10 in which the concentration of water soluble oxidation catalyst material maintained in said DMT esterified oxidate residue is about 300–5000 p.p.m.

12. A method according to claim 11 in which the concentration of said catalyst material in said aqueous solution is about 300–10,000 p.p.m.

13. A continuous method for the recovery of water-soluble catalyst material from a water-immiscible organic residue containing the same and inert under the conditions of this method, in which an aqueous solution of said catalyst material is obtained, which comprises establishing said residue in finely divided dispersion in part of said aqueous solution at a weight ratio of aqueous solution to said residue over 1:1, and maintaining said residue in said dispersion for a period of time sufficient for substantial transfer of said catalyst material from said residue to said aqueous solution, separating in a phase separation zone the dispersion into an aqueous phase and an extracted residue phase, withdrawing extracted residue phase from said separation zone, gently admixing at least half of said extracted residue phase with an aqueous solvent, and introducing the resulting mixture into said phase separation zone, withdrawing as said aqueous solution aqueous phase from said phase separation zone, discharging as extracted residue the remainder of the extracted residue phase, and discharging as an aqueous solution of recovered catalyst material the remainder of said aqueous solution.

* * * * *